(12) United States Patent
Kim et al.

(10) Patent No.: US 10,882,519 B2
(45) Date of Patent: Jan. 5, 2021

(54) APPARATUS AND METHOD FOR SETTING SPEED OF VEHICLE

(71) Applicants: Hyundai Motor Company, Seoul (KR); Kia Motors Corporation, Seoul (KR)

(72) Inventors: Hoi Won Kim, Gyeonggi-do (KR); Doo Jin Um, Seoul (KR); Dong Gu Lee, Seoul (KR); Dong Eon Oh, Seoul (KR); Hyun Jae Yoo, Seoul (KR); Beom Jun Kim, Seoul (KR); Dae Young Kim, Gyeonggi-do (KR); Young Min Han, Gyeonggi-do (KR); Seung Geon Moon, Gyeonggi-do (KR); Sung Woo Choi, Gyeonggi-do (KR); Chan Il Park, Chungcheongbuk-do (KR); Sung Yoon Yeo, Seoul (KR); Kyoung Jun Lee, Seoul (KR); Min Chul Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 16/203,685

(22) Filed: Nov. 29, 2018

(65) Prior Publication Data
US 2019/0256085 A1 Aug. 22, 2019

(30) Foreign Application Priority Data
Feb. 20, 2018 (KR) .................. 10-2018-0019683

(51) Int. Cl.
*B60W 30/09* (2012.01)
*B60W 30/12* (2020.01)

(52) U.S. Cl.
CPC ............ *B60W 30/09* (2013.01); *B60W 30/12* (2013.01); *B60W 2420/42* (2013.01);
(Continued)

(58) Field of Classification Search
USPC .......................................................... 701/93
See application file for complete search history.

(56) References Cited

U.S. PATENT DOCUMENTS 9,542,847 B2 * 1/2017 Sherony ................. G08G 1/167
9,583,003 B2   2/2017 Shimizu
(Continued)

FOREIGN PATENT DOCUMENTS

JP    2016-055768 A    4/2016
JP    2017-065357 A    4/2017
(Continued)

*Primary Examiner* — Tyler D Paige
(74) *Attorney, Agent, or Firm* — Mintz Levin Cohn Ferris Glovsky and Popeo, P.C.; Peter F. Corless

(57) ABSTRACT

An apparatus for setting a speed of a vehicle is provided. The apparatus includes a first camera, a second camera, a navigation, and a processor. The processor detects inattention of a driver of the vehicle based on an operation for a steering device of the vehicle, an operation for a deceleration device of the vehicle, an operation for an acceleration device of the vehicle, or an image obtained by the first camera. The processor also obtains information associated with a lane of a road in which the vehicle is traveling and information associated with a surrounding vehicle based on an image obtained by the second camera, a heading angle of the vehicle, a speed of the vehicle, a yaw rate of the vehicle, a trajectory of the surrounding vehicle, or a curvature of the road, obtained by the navigation, and performs deceleration control.

19 Claims, 10 Drawing Sheets

(52) U.S. Cl.
CPC ..... *B60W 2520/06* (2013.01); *B60W 2520/14* (2013.01); *B60W 2540/30* (2013.01); *B60W 2552/30* (2020.02); *B60W 2554/804* (2020.02); *B60W 2710/30* (2013.01); *B60W 2720/106* (2013.01)

(56) References Cited

U.S. PATENT DOCUMENTS

| | | | | |
|---|---|---|---|---|
| 9,758,173 | B1* | 9/2017 | Plummer | B60Q 9/00 |
| 9,840,253 | B1* | 12/2017 | Prasad | B62D 15/025 |
| 2003/0033073 | A1* | 2/2003 | Kichima | B60K 31/0008 |
| | | | | 701/96 |
| 2004/0032493 | A1* | 2/2004 | Franke | B60R 1/00 |
| | | | | 348/148 |
| 2006/0149448 | A1* | 7/2006 | Tange | B60T 8/17557 |
| | | | | 701/41 |
| 2007/0027597 | A1* | 2/2007 | Breuel | B60K 31/0008 |
| | | | | 701/41 |
| 2008/0306667 | A1* | 12/2008 | Karnjate | B60T 7/042 |
| | | | | 701/70 |
| 2013/0335213 | A1* | 12/2013 | Sherony | G08G 1/167 |
| | | | | 340/439 |
| 2014/0276112 | A1* | 9/2014 | Fung | A61B 5/02405 |
| | | | | 600/479 |
| 2015/0151725 | A1* | 6/2015 | Clarke | B60W 10/18 |
| | | | | 701/28 |
| 2015/0183430 | A1* | 7/2015 | Schwindt | B60W 30/09 |
| | | | | 701/23 |
| 2015/0334269 | A1* | 11/2015 | Yokota | G06T 7/251 |
| | | | | 382/103 |
| 2016/0001781 | A1* | 1/2016 | Fung | G16H 50/20 |
| | | | | 701/36 |
| 2016/0046290 | A1* | 2/2016 | Aharony | B60W 10/04 |
| | | | | 701/41 |
| 2016/0200318 | A1 | 7/2016 | Parikh et al. | |
| 2016/0339922 | A1* | 11/2016 | Schmidt | B60W 40/08 |
| 2018/0194282 | A1* | 7/2018 | Wolterman | B60W 40/08 |
| 2018/0365533 | A1* | 12/2018 | Sathyanarayana | G06K 9/6267 |
| 2019/0196481 | A1* | 6/2019 | Tay | G01S 13/878 |
| 2019/0256085 | A1* | 8/2019 | Kim | B60W 30/09 |
| 2019/0378041 | A1* | 12/2019 | Dhansri | G06N 20/00 |

FOREIGN PATENT DOCUMENTS

| | | |
|---|---|---|
| KR | 10-1519287 B1 | 5/2015 |
| KR | 10-2016-0023193 A | 3/2016 |

* cited by examiner

APPARATUS AND METHOD FOR SETTING SPEED OF VEHICLE

CROSS-REFERENCE TO RELATED APPLICATION

This application is based on and claims the benefit of priority to Korean Patent Application No. 10-2018-0019683, filed on Feb. 20, 2018, the disclosure of which is incorporated herein in its entirety by reference.

TECHNICAL FIELD

The present disclosure relates to an apparatus and method for setting a target speed of a vehicle, and more particularly, to an apparatus and method that reduce the risk of forward and rear-end collisions in a lane following assist system.

BACKGROUND

With the development of the technology in the automotive industry, a lane following assist system that automatically operates a steering system has been developed to control a vehicle to travel in the center of a lane. When inattention of a driver continues or upon a limit situation of the system, the system may request the driver to transfer the right to control the vehicle over to the system. If the driver does not provide the system with the right to control the vehicle, the system may perform strategies for minimizing risks. One of the strategies may be performed to stop the vehicle. When the system stops the vehicle to minimize risks, the risk of a forward collision may be reduced, but the risk of a rear-end collision with a rear of the vehicle may be increased. Thus, there is a need for the development of a strategy capable of reducing the rear-end collision in addition to the forward collision.

SUMMARY

The present disclosure provides an apparatus and method for performing a strategy to reduce risk of both a forward collision and a rear-end collision in a lane following assist system. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for setting a speed of a vehicle may include: a first camera disposed to capture an image of the inside of the vehicle, a second camera disposed to capture an image of the outside of the vehicle, a navigation, and a processor configured to be electrically connected with the first camera, the second camera, and the navigation. The processor may be configured to detect inattention of a driver of the vehicle based on at least a portion of an operation for a steering device of the vehicle, an operation for a deceleration device of the vehicle, an operation for an acceleration device of the vehicle, or an image obtained by the first camera, when the inattention of the driver is detected, obtain at least a portion of information associated with a lane of a road in which the vehicle is traveling and information associated with a surrounding vehicle based on at least a portion of an image obtained by the second camera, a heading angle of the vehicle, a speed of the vehicle, a yaw rate of the vehicle, a trajectory of the surrounding vehicle, or a curvature of the road, the curvature being obtained by the navigation, and perform deceleration control based on the obtained information.

According to an exemplary embodiment, in response to determining that there is no operation of the driver for the steering device during a first time interval, that there is no operation of the driver for the deceleration device or the acceleration device during a second time interval, and that the driver does not look in the forward direction of the vehicle based on an image captured by the first camera, the processor may be configured to detect the inattention of the driver. After the inattention of the driver is detected and the lane in which the vehicle is being driven is detected, the processor may be configured to set a target speed of the deceleration control to a specified speed.

Additionally, after the inattention of the driver is detected, when the lane and the surrounding vehicle are not detected, the processor may be configured to perform the deceleration control based on a lane, a heading angle of the vehicle, a speed of the vehicle, a yaw rate of the vehicle, and a curvature of the road detected before the inattention of the driver is detected, the curvature being received from the navigation. The processor may be further configured to calculate an estimated time of departure from the detected lane based on the lane, the heading angle of the vehicle, the speed of the vehicle, the yaw rate of the vehicle, and the curvature of the vehicle detected before the inattention of the driver is detected and perform the deceleration control based on the estimated time of departure.

The processor may be configured to set a target speed of the deceleration control based on the estimated time of departure and a predetermined parameter. After the inattention of the driver is detected, when the lane is not detected and when the surrounding vehicle is recognized, the processor may be configured to compare a movement trajectory of the surrounding vehicle with a curvature of the road, the curvature being received from the navigation and perform the deceleration control based on the compared result.

Further, the processor may be configured to calculate a Euclidean distance between the movement trajectory of the surrounding vehicle and the curvature of the road and perform the deceleration control based on the Euclidean distance. The processor may be configured to set a target speed of the deceleration control based on the compared result and a predetermined parameter. The processor may also be configured to change a target speed of the deceleration control based on acceleration of a following vehicle of the vehicle. In particular, the processor may be configured to change a target speed of the deceleration control based on a speed of a surrounding vehicle adjacent to a side of the vehicle.

According to an exemplary embodiment, the apparatus may further include a communication circuit configured to communicate with an external device. When the deceleration control is performed, the processor may be configured to automatically transmit an emergency notification using the communication circuit. Further, the processor may be configured to change a target speed of the deceleration control based on acceleration of a following vehicle of the subject vehicle or a speed of a surrounding vehicle adjacent to a side of the vehicle and determine whether to transmit the emergency notification based on a target speed before the change and the changed target speed.

According to another aspect of the present disclosure, a method for setting a speed of a vehicle may include: detecting inattention of a driver of the vehicle based on at least a portion of an operation for a steering device of the vehicle, an operation for a deceleration device of the vehicle, an operation for an acceleration device of the vehicle, or an image captured by a camera which captures an image of the inside of the vehicle, when the inattention of the driver is detected, obtaining at least a portion of information associated with a lane of a road in which the vehicle is traveling and information associated with a surrounding vehicle of the vehicle based on at least a portion of an image obtained by a camera which captures an image of the outside of the vehicle, a heading angle of the vehicle, a speed of the vehicle, a yaw rate of the vehicle, a trajectory of the surrounding vehicle, or a curvature of the road, and performing deceleration control based on the obtained information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
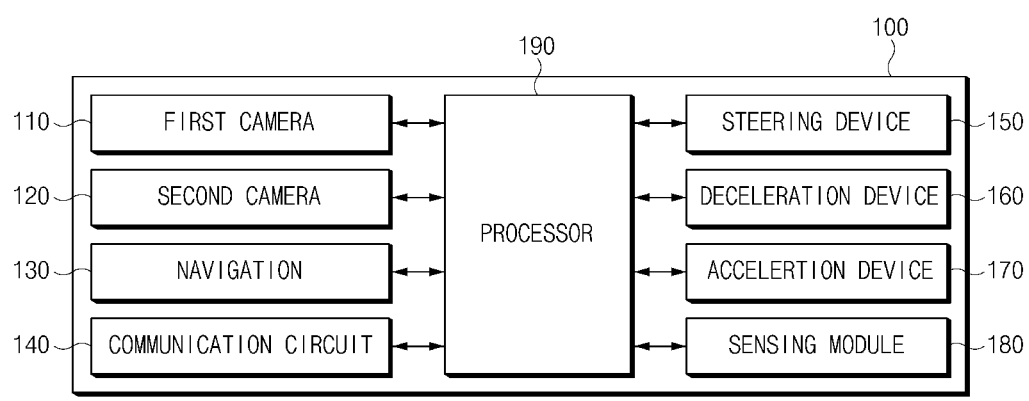
FIG. 1 is a block diagram illustrating a configuration of an apparatus for setting a speed of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail with reference to the accompanying drawings. In adding reference denotations to elements of each drawing, although the same elements are displayed on a different drawing, it should be noted that the same elements have the same denotations. In addition, in describing an exemplary embodiment of the present disclosure, if it is determined that a detailed description of related well-known configurations or functions blurs the gist of an embodiment of the present disclosure, it will be omitted.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for setting a speed of a vehicle according to an exemplary embodiment of the present disclosure. Referring to FIG. 1, an apparatus 100 for setting a speed of a vehicle (hereinafter referred to as "apparatus 100") according to an exemplary embodiment of the present disclosure may include a first camera 110, a second camera 120, a navigation 130, a communication circuit 140, a steering device 150, a deceleration device 160, an acceleration device 170, a sensing module 180 (e.g., a sensor), and a processor 190. The apparatus 100 may be loaded into the vehicle. Notably, the first and second cameras may also be video cameras or other similar devices.

The first camera 110 may be disposed at a location to capture an image of the inside of the vehicle. In particular, first camera 110 may be configured to capture, for example, a face of a driver within the vehicle. The second camera 120 may be disposed at a location to capture an image of the outside of the vehicle. The second camera 120 may be configured to capture, for example, an image of a lane of a road in which the vehicle (e.g., subject vehicle) is traveling and may be configured to capture an image of a surrounding vehicle.

The navigation 130 may be configured to guide the vehicle along a route from a current location of the vehicle toward a destination. In particular, the navigation 130 may be configured to store map information and guide the vehicle along a route using the map information. The navigation 130 may also be configured to provide information regarding a curvature of a road on which the vehicle is traveling. The communication circuit 140 may be configured to communicate with an external device. The communication circuit 140 may be configured to transmit, for example, an emergency notification to the external device.

The acceleration device 170 may include an engine, an accelerator pedal, and the like capable of increasing a speed of the vehicle. The deceleration device 160 may include a brake device, a decelerator pedal (e.g., brake pedal), and the like capable of decreasing a speed of the vehicle. The steering device 150 may include a steering wheel, a steering shaft, a steering gear, a link, and the like capable of adjusting a steering angle of the vehicle. The sensing module 180 may be configured to sense information regarding the vehicle (e.g., the subject vehicle) and a surrounding vehicle. In particular, the sensing module 180 may be configured to sense a variety of information such as a location, a speed, acceleration, and the like of each of the vehicle and the surrounding vehicle. The sensing module 180 may include, for example, a radar, a light detection and ranging (LiDAR), an acceleration sensor, a yaw rate sensor, a torque sensor, a wheel speed sensor, and/or the like.

The processor 190 may be electrically connected with the first camera 110, the second camera 120, the navigation 130, the communication circuit 140, the steering device 150, the deceleration device 160, the acceleration device 170, and the sensing module 180. The processor 190 may be configured to operate each of the first camera 110, the second camera 120, the navigation 130, the communication circuit 140, the steering device 150, the deceleration device 160, the acceleration device 170, and the sensing module 180 and perform a variety of data processing and various arithmetic operations.

According to an exemplary embodiment, the processor 190 may be configured to detect inattention (e.g., lack of attentiveness, distraction, etc.) of a driver of the vehicle based on at least a portion of an operation for the steering device 150 of the vehicle, an operation for the deceleration device 160 of the vehicle, an operation for the acceleration device 170 of the vehicle, or an image obtained by the first camera 110. For example, in response to determining that there is no operation of the driver at the steering device 150 during a first time interval, no operation of the driver at the deceleration device 160 or the acceleration device 170 during a second time interval, or that the driver does not look in a forward direction of the vehicle based on an image captured by the first camera 110, the processor 190 may be configured to detect inattention of the driver. In other words, the processor may be configured to determine that the steering device has not been adjusted by the driver, that the deceleration device or acceleration device have either not been engaged or force exerted thereon has not been adjusted, and that the driver's view is not in the driving direction of the vehicle to thus detect inattention of the driver.

Additionally, the processor 190 may be configured to detect driver intervention or adjustment of the steering device 150 using the torque sensor connected with the steering device 150. The processor 190 may be configured to determine driver intervention or adjustment of the deceleration device 160 or the acceleration device 170 using a sensor or a switch connected with a decelerator pedal or an accelerator pedal. The processor 190 may also be configured to determine whether the driver maintains a forward view the vehicle by analyzing an image obtained by the first camera 110.

According to an exemplary embodiment, when the inattention of the driver is detected, the processor 190 may be configured to obtain information associated with a lane of a road in which the vehicle is traveling and information associated with a surrounding vehicle of the vehicle based on at least a portion of an image obtained by the second camera 120, a heading angle of the vehicle, a speed of the vehicle, a yaw rate of the vehicle, a trajectory of the surrounding vehicle, or a curvature of the road, obtained by the navigation 130, and may be configured to perform deceleration control based on the obtained information. In particular, the processor 190 may be configured to perform deceleration control with various strategies based on whether a lane is detected or whether the surrounding vehicle is recognized when the inattention of the driver is detected.

After the inattention of the driver is detected, when a lane is detected, the processor 190 may be configured to set a target speed of deceleration control to a predetermined speed. Since a lane following assist system is capable of operating normally when the lane is detected, the processor 190 may be configured to reduce the vehicle to a specified speed without performing excessive deceleration control.

Additionally, after the inattention of the driver is detected, when a lane and a surrounding vehicle are not detected, the processor 190 may be configured to perform deceleration control based on a lane, a heading angle of the vehicle, a speed of the vehicle, a yaw rate of the vehicle and a curvature of a road detected before the inattention is detected, received from the navigation 130. For example, the processor 190 may be configured to calculate an estimated time of departure from the detected lane in which the vehicle is being driven based on the lane (e.g., based on lane boundaries or markings), the heading angle of the vehicle, the speed of the vehicle, the yaw rate of the vehicle, and the curvature of the vehicle detected before the inattention of the driver is detected and may be configured to perform deceleration control based on the estimated time of departure.

The processor 190 may further be configured to obtain information regarding a remaining lateral distance di to a departure of a left lane detected before the inattention of the driver is detected, a remaining lateral distance $d_r$ to a departure of a right lane detected before the inattention of the driver is detected, and a heading angle $\theta$ of the vehicle. In addition, the processor 190 may be configured to obtain information regarding a speed V of the vehicle using, for example, a wheel speed sensor. The processor 190 may be configured to obtain information regarding a yaw rate $\gamma$ of the vehicle using, for example, a yaw rate sensor and a curvature ρ of a road on which the vehicle is traveling using the navigation 130. The processor 190 may then be configured to calculate an estimated time of departure based on the obtained information. An exemplary equation for calculating the estimated time of departure may be the following Equation 1.

$$d_{l.mar} = d_l - V\theta t + \frac{1}{2}\rho V^2 t^2 - \frac{1}{2}\gamma V t^2$$

$$d_{r.mar} = d_r - V\theta t + \frac{1}{2}\rho V^2 t^2 - \frac{1}{2}\gamma V t^2$$

$$t_{l.dep} = \frac{V\theta \pm \sqrt{(V\theta)^2 - 4(\rho V^2 - \gamma V)d_l}}{\rho V^2 - \gamma V}$$

$$t_{r.dep} = \frac{V\theta \pm \sqrt{(V\theta)^2 - 4(\rho V^2 - \gamma V)d_r}}{\rho V^2 - \gamma V}$$

$$t_{min.dep} = \min(t_{l.dep}, t_{r.dep})$$

Equation 1

Herein, $d_{l.mar}$ may refer to a remaining lateral distance to a left lane after t seconds, $d_{r.mar}$ may refer to a remaining lateral distance to a right lane after t seconds, $t_{l.dep}$ may refer to an estimated time of departure from the left lane, $t_{r.dep}$ may refer to an estimated time of departure from the right lane, and $t_{min.dep}$ may refer to an estimated time of departure.

According to an exemplary embodiment, the processor 190 may be configured to set a target speed of deceleration control based on an estimated time of departure and a predetermined parameter. As the estimated time of departure is decreases, the processor 190 may be configured to set a slower target speed. After the inattention of the driver is detected, when a lane is not detected and when a surrounding vehicle is recognized, the processor 190 may be configured to compare a movement trajectory of the surrounding vehicle with a curvature of a road, received from the navigation 130 and perform deceleration control based on the compared result.

For example, the processor 190 may be configured to calculate a Euclidean distance between the movement trajectory of the surrounding vehicle and the curvature of the road and perform deceleration control based on the Euclidean distance. The processor 190 may be configured to obtain, for example, a curvature $\rho_{vch}$ of the movement trajectory of the surrounding vehicle by analyzing an image obtained by the second camera 120 or using a radar, a LiDAR, or the like. Alternately, the processor 190 may be configured to obtain, for example, information regarding a curvature $\rho_{navi}$ of a road where the vehicle is traveling using the navigation 130. The processor 190 may continue obtaining the above-mentioned information and may be configured to calculate a Euclidean distance $\sigma_{cur}$ between the movement trajectory of the surrounding vehicle and the curvature of the road based on a plurality of obtained samples. An exemplary equation for calculating the Euclidean distance $\sigma_{cur}$ may be the following Equation 2.

$$\sigma_{cur} = \sqrt{(\rho_{navi.t} - \rho_{veh.t})^2 + (\rho_{navi.t-1} - \rho_{veh.t-1})^2 + \ldots + (\rho_{navi.t-n} - \rho_{veh.t-n})^2}$$

Equation 2

According to an exemplary embodiment, the processor 190 may be configured to set a target speed of deceleration control based on a compared result and a predetermined parameter. As a Euclidean distance is increased, the processor 190 may be configured to set a slower target speed. The processor 190 may be configured to change a target speed of deceleration control based on acceleration of a following vehicle of the subject vehicle (e.g., a vehicle driving behind the subject vehicle or approaching the subject vehicle from a rear direction). The processor 190 may be configured to reduce the risk of a rear-end collision by increasing a target speed when a dangerous situation such as the rear-end collision is repeated. As an absolute value of acceleration of the following vehicle increases (when the following vehicle suddenly decelerates), the processor 190 may be configured to increase the target speed.

Further, the processor 190 may be configured to change a target speed of deceleration control based on a speed of a surrounding vehicle adjacent to a side of the vehicle (e.g., a proximate vehicle). When a relative speed between the vehicle and the surrounding vehicle is fast, the processor 190 may be configured to increase a target speed to match the target speed with a surrounding traffic flow. As the relative speed increases, the processor 190 may be configured to increase the target speed.

According to an exemplary embodiment, the apparatus 100 may further include the communication circuit 140 configured to communicate with an external device. When deceleration control is performed, the processor 190 may be configured to automatically transmit an emergency notification to the external device using the communication circuit 140. The processor 190 may be configured to change a target speed of deceleration control based on acceleration of a following vehicle of the vehicle or a speed of the surrounding vehicle adjacent to a side of the vehicle and determine whether to transmit an emergency notification, based on a target speed before the change and the changed target speed. In a congested area, the driver may drive the vehicle while intentionally meeting all of inattention determination conditions. In this case, an unnecessary emergency notification may be transmitted potentially causing user dissatisfaction and occurrence of unnecessary costs. Thus, when a target speed is continuously changed, the processor 190 may be configured to transmit an emergency notification.

Figure 2:
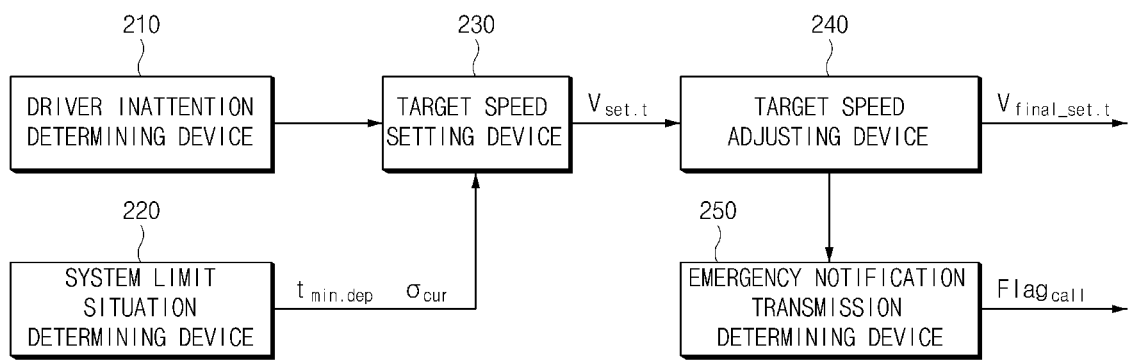
FIG. 2 is a block diagram illustrating a configuration of a program module included in an apparatus for setting a speed of a vehicle according to an exemplary embodiment of the present disclosure.

FIG. 2 is a block diagram illustrating a configuration of a program module included in an apparatus for setting a speed of a vehicle according to an exemplary embodiment of the present disclosure. Referring to FIG. 2, the program module according to an exemplary embodiment may include a driver inattention determining device 210, a system limit situation determining device 220, a target speed setting device 230, a target speed adjusting device, and an emergency notification transmission determining device 250. The program module may be stored in a memory of an apparatus 100 of FIG. 1 and may be operated by an overall controller.

The driver inattention determining device 210 may be configured to determine inattention of a driver based on steering intervention or adjustment of the driver, a driver operation of an accelerator pedal, a driver operation of a decelerator pedal, whether the driver looks in a forward direction of a vehicle, and the like. In a limit situation of a lane following assist system (e.g., when inattention of the driver is detected and when a lane is not detected), the system limit situation determining device 220 may be configured to calculate an estimated time $t_{min.dep}$ of departure from a lane and a Euclidean distance $\sigma_{cur}$ between a movement trajectory of a surrounding vehicle and a curvature of a road based on a driving environment of the vehicle.

The target speed setting device 230 may be configured to set a target speed $V_{set.t}$ for deceleration control of the vehicle in the system limit situation. When the inattention of the driver is detected by the driver inattention determining device 210, the target speed setting device 230 may be configured to calculate a target speed based on the estimated time $t_{min.dep}$ of departure and the Euclidean distance $\sigma_{cur}$ calculated by the system limit situation determining device 220. A description will be given in detail of an operation of the target speed setting device 230 with reference to FIG. 6.

The target speed adjusting device 240 may be configured to adjust a target speed in consideration of driving of the surrounding vehicle. In other words, the target speed may be adjusted based on the speed of the surrounding vehicle. The target speed adjusting device 240 may be configured to calculate an adjusted target speed $V_{final\_set.t}$ based on acceleration of a following vehicle, a relative speed of a side vehicle, and the like. A description will be given in detail of an operation of the target speed adjusting device 240 with reference to FIGS. 7 and 8. The emergency notification transmission determining device 250 may be configured to change a flag $Flag_{call}$ of determining whether to transmit an emergency notification based on the adjustment of the target speed. A description will be given in detail of an operation of the emergency notification transmission determining device 250 with reference to FIG. 9.

Figure 3:
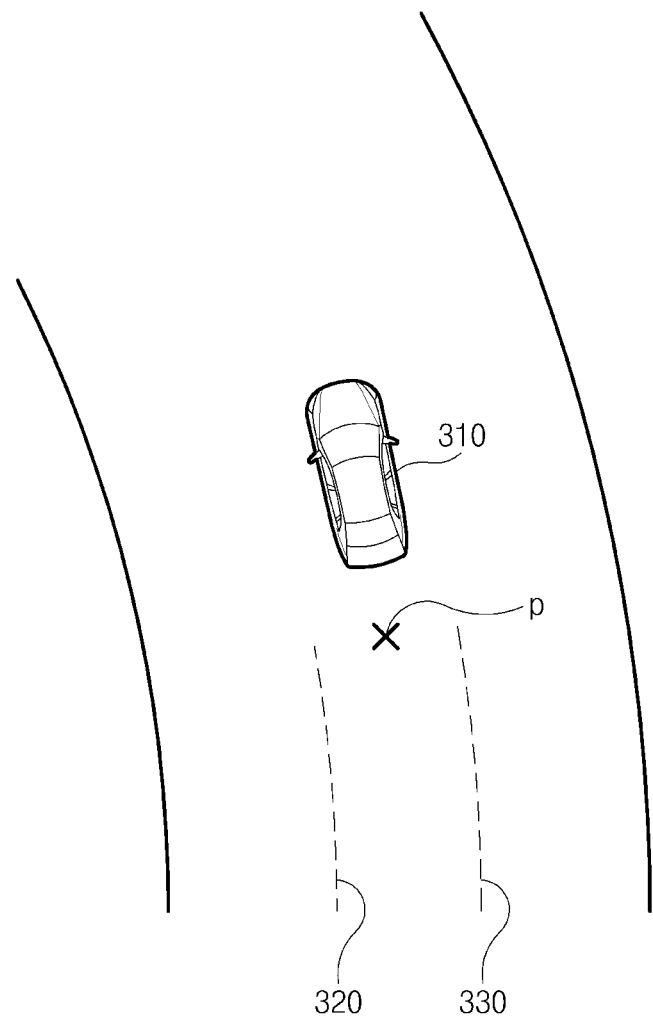
FIG. 3 is a drawing illustrating an exemplary operation of an apparatus for setting a speed of a vehicle according to an exemplary embodiment of the present disclosure.

FIG. 3 is a drawing illustrating an exemplary operation of an apparatus for setting a speed of a vehicle according to an exemplary embodiment of the present disclosure. Referring to FIG. 3, a vehicle 310 or subject vehicle according to an exemplary embodiment may travel along a road. For example, the vehicle 310 may be configured to detect inattention of a driver when a first lane 320 and a second lane 330 are not detected. Further, there may be no surrounding vehicle adjacent to the vehicle 310 on the road. Accordingly, the vehicle 310 may be configured to obtain information regarding a remaining lateral distance to a departure of the first lane 320, a remaining lateral distance to a departure of the second lane 330, and a heading angle of the vehicle 310 by analyzing an image obtained at a point p before the inattention is detected. The vehicle 310 may additionally be configured to obtain information regarding speed of the vehicle, yaw rate, and a curvature of the road. The vehicle 310 may then be configured to calculate an estimated time of departure based on the obtained information. The vehicle 310 may also be configured to calculate a target speed for deceleration control based on the estimated time of departure and perform the deceleration control using the calculated target speed.

Figure 4:
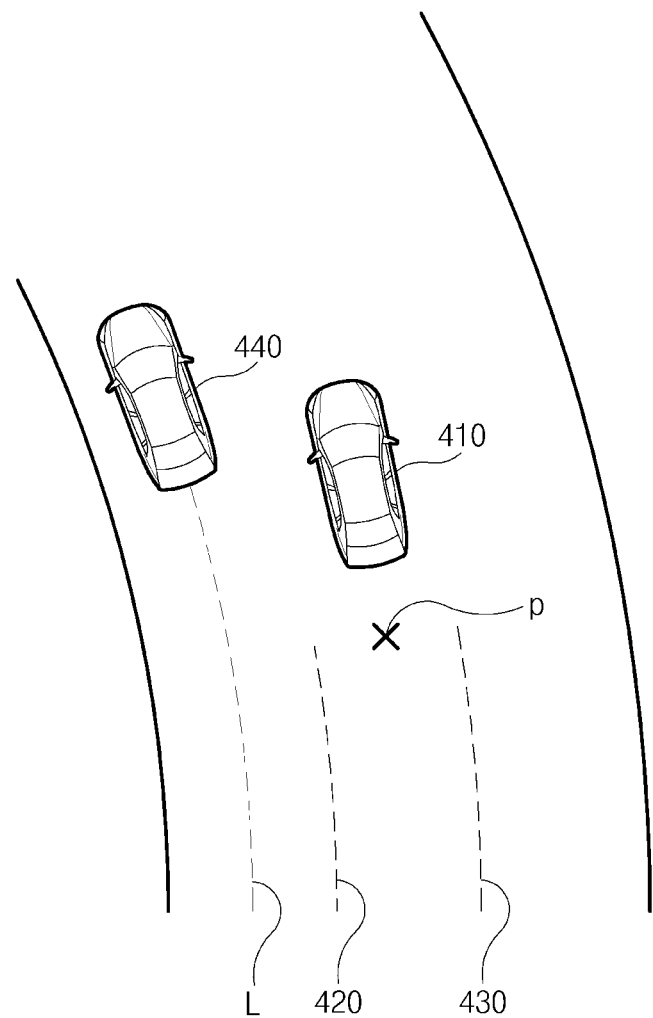
FIG. 4 is a drawing illustrating an exemplary operation of an apparatus for setting a speed of a vehicle according to an exemplary embodiment of the present disclosure.

FIG. 4 is a drawing illustrating an exemplary operation of an apparatus for setting a speed of a vehicle according to an exemplary embodiment of the present disclosure. Referring to FIG. 4, a vehicle 410 according to an exemplary embodiment may travel along a road. For example, the vehicle 410 may be configured to detect inattention of a driver when a first lane 420 and a second lane 430 are not detected. Further, a surrounding vehicle 440 adjacent to the vehicle 410 may be detected on the road. Accordingly, the vehicle 410 may be configured to obtain a movement trajectory L of the surrounding vehicle 440 using a camera, a radar, a LiDAR, and/or the like and obtain a curvature of the road on which the vehicle 410 is traveling, using a navigation. The vehicle 410 may then be configured to calculate similarity between a curvature of the movement trajectory L and the curvature of the road based on the obtained information. The vehicle 410 may be configured to calculate a target speed for deceleration control based on the similarity and perform the deceleration control using the calculated target speed.

Figure 5:
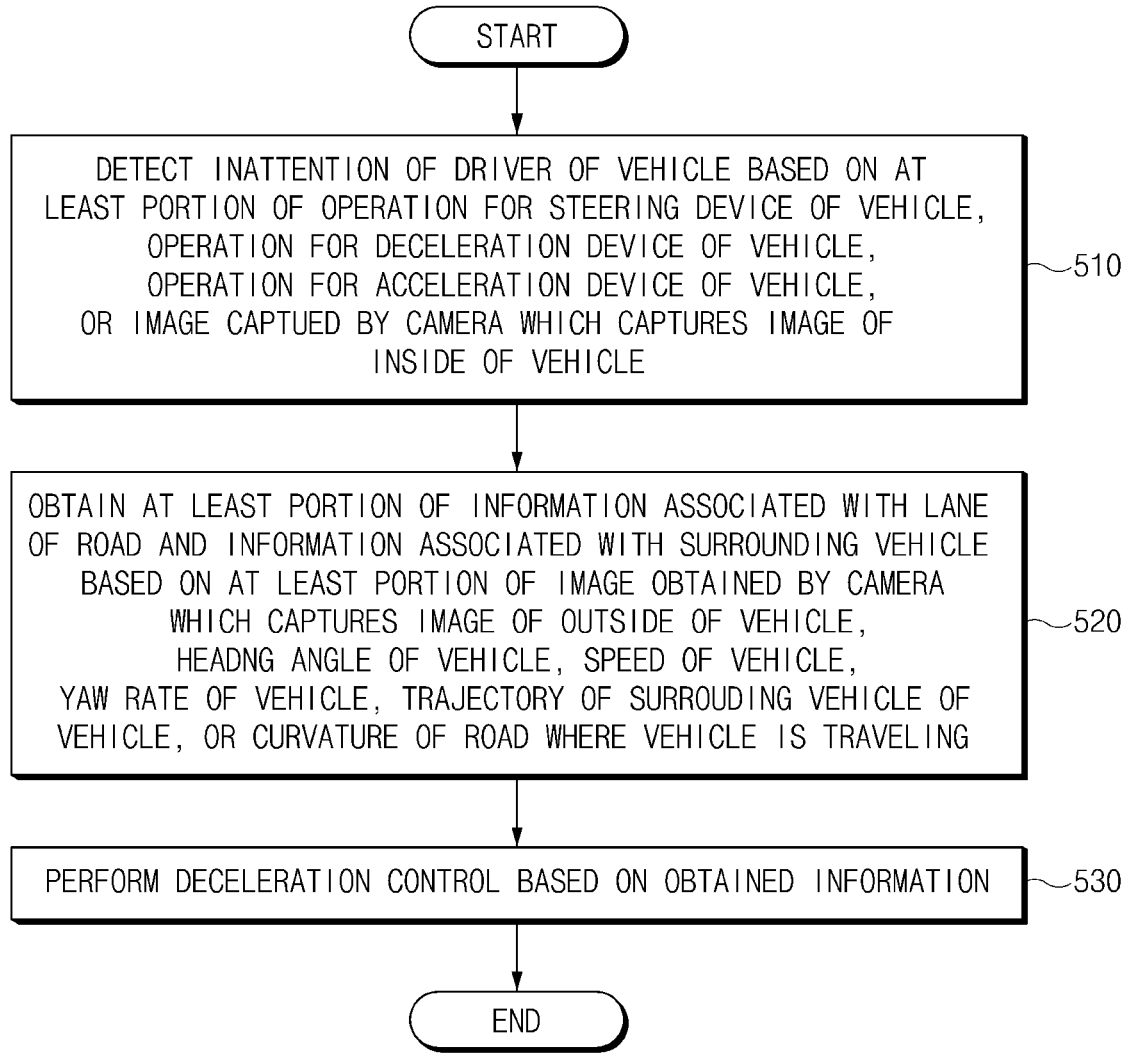
FIG. 5 is a flowchart illustrating a method for setting a speed of a vehicle according to an exemplary embodiment of the present disclosure.

FIG. 5 is a flowchart illustrating a method for setting a speed of a vehicle according to an exemplary embodiment of the present disclosure. Hereinafter, it may be assumed that an apparatus 100 of FIG. 1 performs a process of FIG. 5. Further, in a description of FIG. 5, an operation described as being performed by an apparatus may be understood as being controlled by a processor 190 of the apparatus 100.

Referring to FIG. 5, the apparatus may be configured to determine whether inattention of a driver of a vehicle is detected based on an operation for a steering device of the vehicle, an operation for a deceleration device of the vehicle, an operation for an acceleration device of the vehicle, or an image captured by a camera which captures an image of the inside of the vehicle. For example, in response to determining that there are no operation of the steering device, no operation of the deceleration device, and no operation of the acceleration during a specified time and that the driver does not look in the forward direction of the vehicle, the apparatus may be configured to detect the inattention of the driver.

In operation 520, the apparatus may be configured to obtain at least a portion of information associated with a lane of a road in which the vehicle is traveling and information associated with a surrounding vehicle of the vehicle based on at least a portion of an image obtained by a camera which captures an image of the outside of the vehicle, a heading angle of the vehicle, a speed of the vehicle, a yaw rate of the vehicle, a trajectory of the surrounding vehicle, or a curvature of the road. For example, when the inattention of the driver is detected and when the lane is not detected, the vehicle may be configured to obtain the above-mentioned information.

In operation 530, the apparatus may be configured to perform deceleration control based on the obtained information. For example, the apparatus may be configured to set a target speed based on an estimated time of departure from a lane of the vehicle or similarity between a curvature of a movement trajectory of the surrounding vehicle and a curvature of the road and perform deceleration control using the set target speed.

Figure 6:
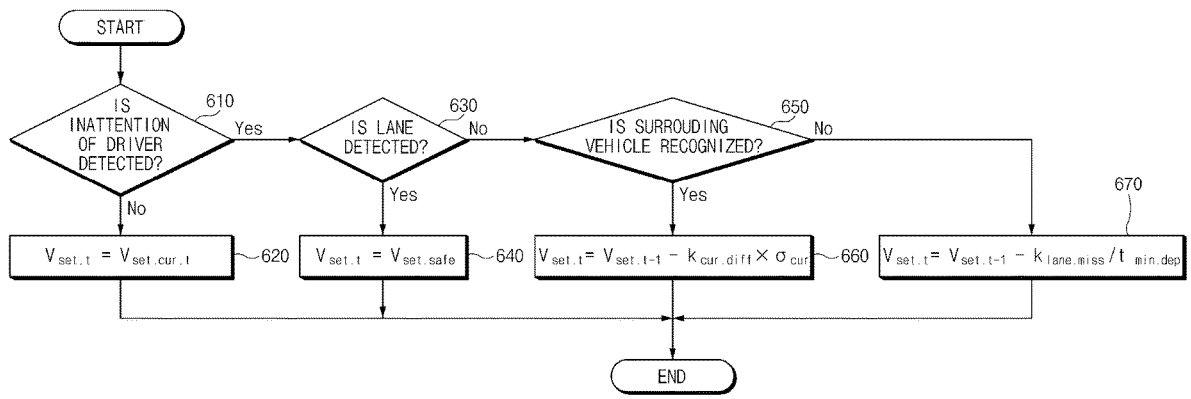
FIG. 6 is a flowchart illustrating a method for setting a speed of a vehicle according to an exemplary embodiment of the present disclosure.

FIG. 6 is a flowchart illustrating a method for setting a speed of a vehicle according to an exemplary embodiment of the present disclosure. Hereinafter, it may be assumed that an apparatus 100 of FIG. 1 performs a process of FIG. 6. Further, in a description of FIG. 6, an operation described as being performed by an apparatus may be understood as being controlled by a processor 190 of the apparatus 100.

Referring to FIG. 6, the apparatus may be configured to determine whether inattention of a driver is detected. When the inattention of the driver is not detected, in operation 620, the apparatus may maintain a current target speed $V_{set.cur.t}$. When the inattention of the driver is detected, in operation 630, the apparatus may be configured to determine whether a lane is detected. When the lane is detected (e.g., lane boundaries or the like are detected), in operation 640, the apparatus may be configured to set a target speed $V_{set.t}$ to a specified speed $V_{set.safe}$.

When the lane is not detected, in operation 650, the apparatus may be configured to determine whether a surrounding vehicle is recognized. When the surrounding vehicle is recognized, in operation 660, the apparatus may be configured to set the target speed $V_{set.t}$ using an equation ($V_{set.t} = V_{set.t-1} - k_{cur.diff} \times \sigma_{cur}$) shown in FIG. 6 based on a previous target speed $V_{set.t-1}$, a parameter $k_{cur.diff}$ applied when the surrounding vehicle is recognized, and a Euclidean distance $\sigma_{cur}$ between a curvature of a movement trajectory of the surrounding vehicle and a curvature of a road. When the surrounding vehicle is not recognized, in operation 670, the apparatus may be configured to set the target speed $V_{set.t}$ using an equation ($V_{set.t}=V_{set.t-1}-k_{lane.miss} \times k_{min.dep}$) shown in FIG. 6 based on the previous target speed $V_{set.t-1}$, a parameter $k_{lane.miss}$ applied when the surrounding vehicle is not recognized, and an estimated time $t_{min.dep}$ of departure from a lane.

Figure 7:
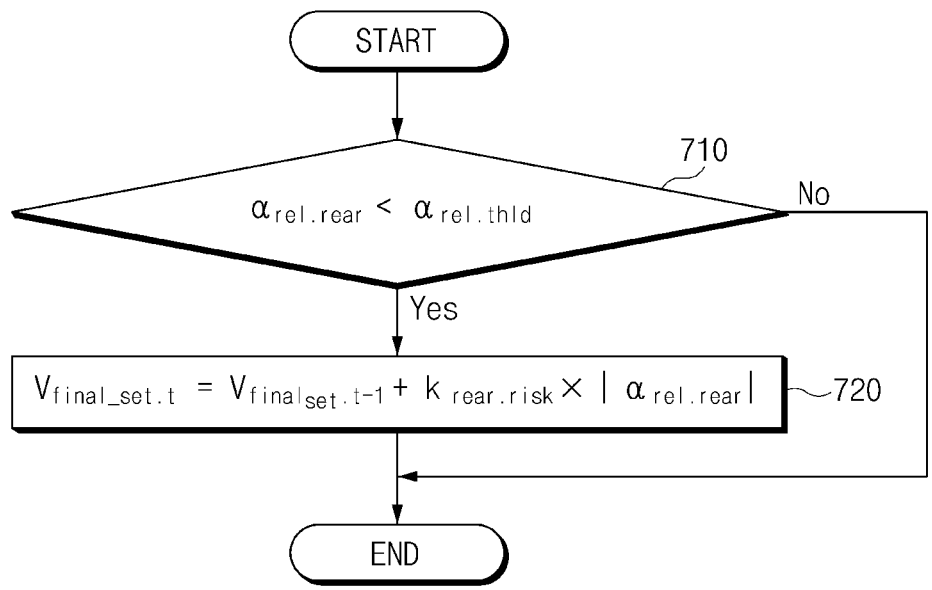
FIG. 7 is a flowchart illustrating a method for setting a speed of a vehicle according to an exemplary embodiment of the present disclosure.

FIG. 7 is a flowchart illustrating a method for setting a speed of a vehicle according to an exemplary embodiment of the present disclosure. Hereinafter, it may be assumed that an apparatus 100 of FIG. 1 performs a process of FIG. 7. Further, in a description of FIG. 7, an operation described as being performed by an apparatus may be understood as being controlled by a processor 190 of the apparatus 100.

Referring to FIG. 7, in operation 710, the apparatus may be configured to determine whether acceleration $a_{rel.real}$ of a following vehicle is less than a specified value $a_{rel.thld}$. When the acceleration $a_{rel.rear}$ of the following vehicle is less than the specified value $a_{rel.thld}$, in operation 720, the apparatus may be configured to determine that the risk of a rear-end collision is high and calculate an adjusted target speed $V_{final\text{-}set.t}$ based on a previous target speed $V_{final\_set.t-1}$, a parameter $k_{rear.risk}$ for adjusting a target speed, and the acceleration $a_{rel.rear}$ of the following vehicle. When the acceleration $a_{rel.rear}$ of the following vehicle is greater than or equal to the specified value $a_{rel.thld}$, the apparatus may be configured to determine that the risk of the rear-end collision is low and may fail to adjust the target speed.

Figure 8:
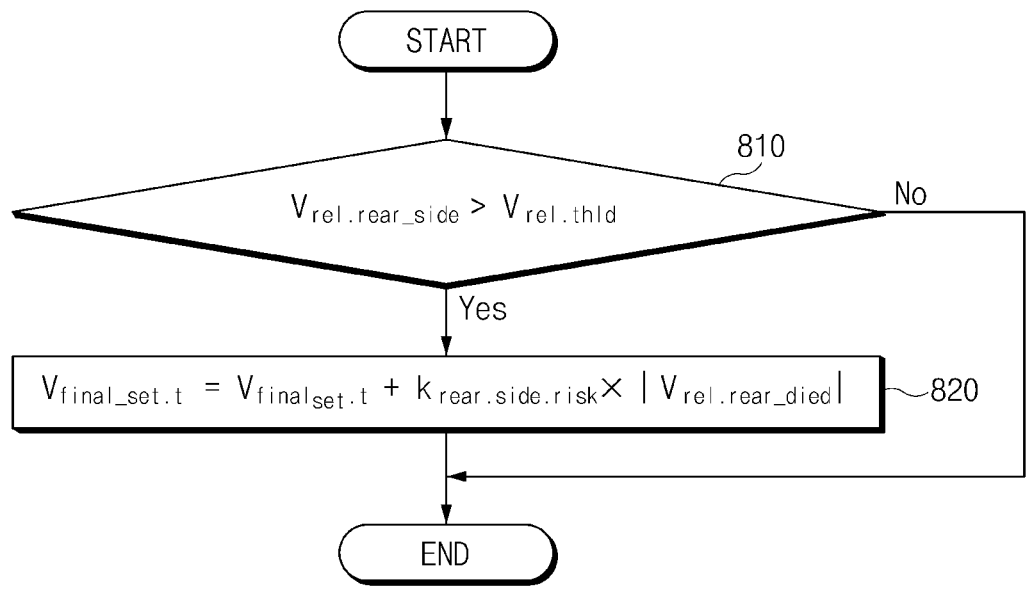
FIG. 8 is a flowchart illustrating a method for setting a speed of a vehicle according to an exemplary embodiment of the present disclosure.

FIG. 8 is a flowchart illustrating a method for setting a speed of a vehicle according to an exemplary embodiment of the present disclosure. Hereinafter, it may be assumed that an apparatus 100 of FIG. 1 performs a process of FIG. 8. Further, in a description of FIG. 8, an operation described as being performed by an apparatus may be understood as being controlled by a processor 190 of the apparatus 100.

Referring to FIG. 8, in operation 810, the apparatus may be configured to determine whether a relative speed $V_{rel.rear\_side}$ of a following and side vehicle is greater than a specified value $V_{rel.thld}$. When the relative speed $V_{rel.rear\_side}$ of the following and side vehicle is greater than the specified value $V_{rel.thld}$, in operation 820, the apparatus may be configured to determine that a risk based on a detected traffic flow is high and calculate an adjusted target speed $V_{final\_set.t}$ based on a previous target speed $V_{final\_set.t-1}$, a parameter $k_{rear\_side.risk}$ for adjusting a target speed, the relative speed $V_{rel.rear\_side}$ of the following and side vehicle. When the relative speed $V_{rel.rear\_side}$ of the following and side vehicle is less than or equal to the specified value $V_{rel.thld}$, the apparatus may be configured to determine that the risk according to the traffic flow is low and may fail to adjust the target speed.

Figure 9:
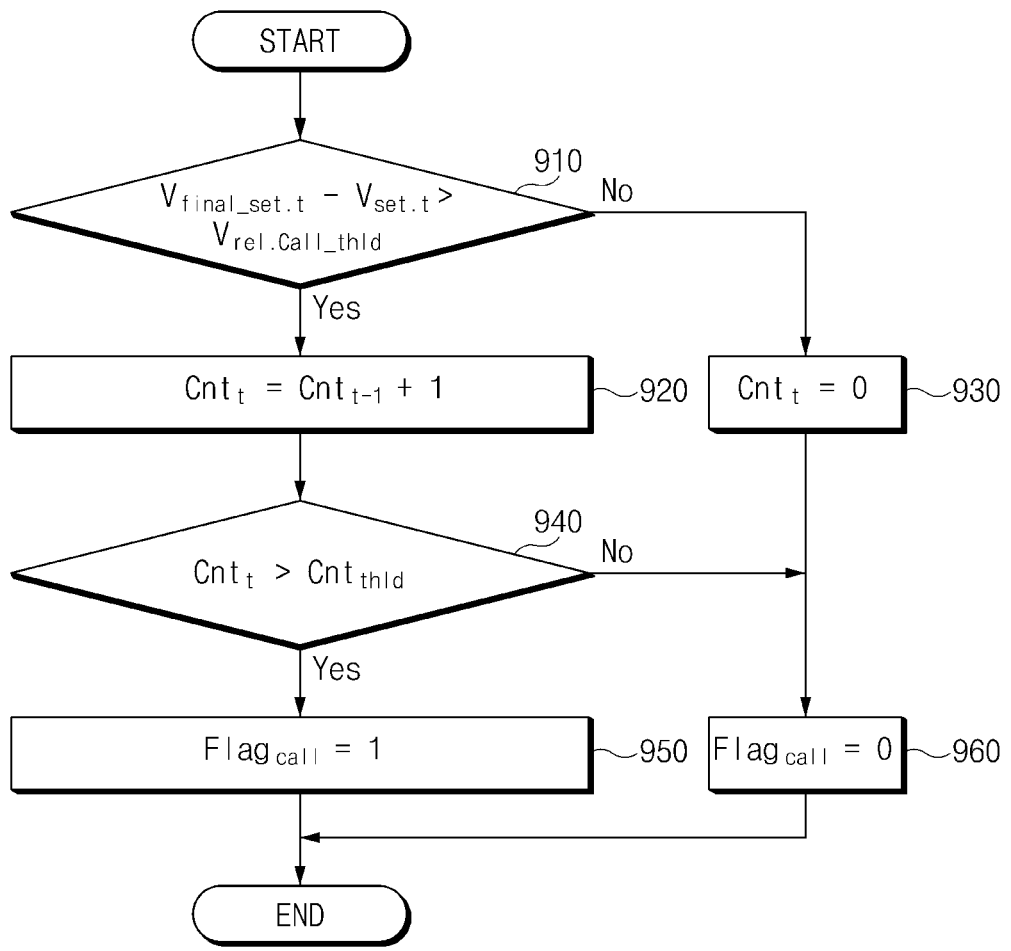
FIG. 9 is a flowchart illustrating a method for setting a speed of a vehicle according to an exemplary embodiment of the present disclosure.

FIG. 9 is a flowchart illustrating a method for setting a speed of a vehicle according to an exemplary embodiment of the present disclosure. Hereinafter, it may be assumed that an apparatus 100 of FIG. 1 performs a process of FIG. 9. Further, in a description of FIG. 9, an operation described as being performed by an apparatus may be understood as being controlled by a processor 190 of the apparatus 100.

Referring to FIG. 9, in operation 910, the apparatus may be configured to determine whether a difference between an adjusted target speed $V_{final\_set.t}$ (e.g., a target speed adjusted by a target speed adjusting device 240 of FIG. 2) and a target speed $V_{set.t}$ before adjustment (e.g., a target speed set by a target speed setting device 230 of FIG. 2) is greater than a specified value $V_{rel.call\_thld}$.

When the difference between the adjusted target speed $V_{final\_set.t}$ and the target speed $V_{set.t}$ before the adjustment is greater than the specified value $V_{rel.call\_thld}$, in operation 920, the apparatus may be configured to increase a counter $Cnt_t$ for an emergency notification. When the difference between the adjusted target speed $V_{final\_set.t}$ and the target speed $V_{set.t}$ before the adjustment is less than or equal to the specified value $V_{rel.call\_thld}$, in operation 930, the apparatus may be configured to initialize the counter $Cnt_t$.

When the counter $Cnt_t$ is increased, in operation 940, the apparatus may be configured to determine whether the counter $Cnt_t$ for the emergency notification is greater than a specified value $Cnt_{thld}$. When the counter $Cnt_t$ for the emergency notification is greater than the specified value $Cnt_{thld}$, the apparatus may be configured to set a flag $Flag_{call}$ for the emergency notification to "1" and transmit the emergency notification. When the counter is initialized or when the counter $Cnt_t$ for the emergency notification is less than or equal to the specified value $Cnt_{thld}$, the apparatus may be configured to set the flag $Flag_{call}$ to "0" and may avoid transmitting the emergency notification.

Figure 10:
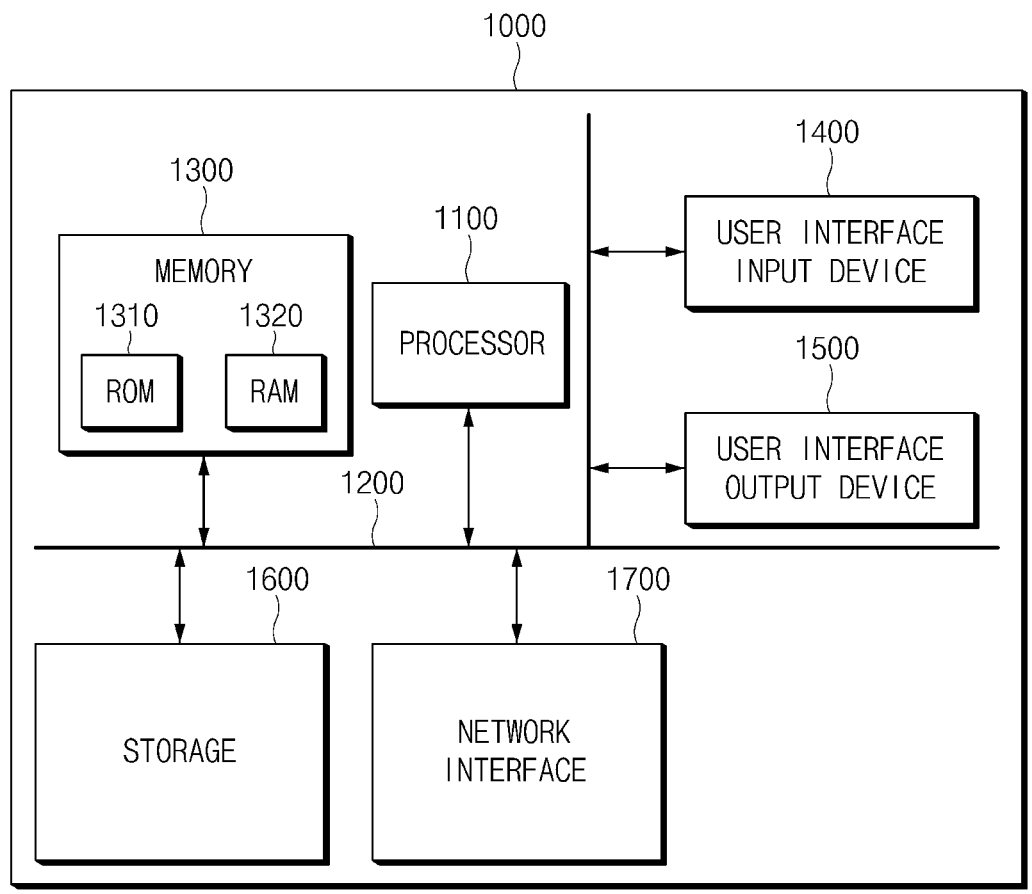
FIG. 10 is a block diagram illustrating a configuration of a computing system according to an exemplary embodiment of the present disclosure.

FIG. 10 is a block diagram illustrating a configuration of a computing system according to an exemplary embodiment of the present disclosure. Referring to FIG. 10, the above-mentioned method according to an exemplary embodiment of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device configured to execute processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the exemplary embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for setting a speed of the vehicle according to an exemplary embodiment of the present disclosure may set a target speed of the vehicle to reduce risks of a forward collision and a rear-end collision based on an estimated time of departure from a lane of the vehicle or similarity between a movement trajectory of a surrounding vehicle and a curvature of a road based on a driving situation of the vehicle. In addition, various effects indirectly or directly ascertained through the present disclosure may be provided.

While the present disclosure has been described with reference to exemplary embodiments, it will be apparent to those skilled in the art that various changes and modifications may be made without departing from the spirit and scope of the present disclosure. Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for setting a speed of a vehicle, comprising:
   a first camera disposed to capture an image of the inside of the vehicle;
   a second camera disposed to capture an image of the outside of the vehicle;
   a navigation; and
   a processor configured to be electrically connected with the first camera, the second camera, and the navigation,
   wherein the processor is configured to:
      detect inattention of a driver of the vehicle based on an operation for a steering device of the vehicle, an operation for a deceleration device of the vehicle, an operation for an acceleration device of the vehicle, or an image obtained by the first camera;
      when the inattention of the driver is detected, obtain information associated with a lane of a road in which the vehicle is traveling and information associated with a surrounding vehicle of the vehicle based on an image obtained by the second camera, a heading angle of the vehicle, a speed of the vehicle, a yaw rate of the vehicle, a trajectory of the surrounding vehicle, or a curvature of the road, the curvature being obtained by the navigation; and
      perform deceleration control based on the obtained information.

2. The apparatus of claim 1, wherein the processor is configured to:
   in response to determining that there is no driver operation of the steering device during a first time interval, no driver operation of the deceleration device or the acceleration device during a second time interval, and that the driver does not look in a forward direction of the vehicle based on an image captured by the first camera, detect the inattention of the driver.

3. The apparatus of claim 1, wherein the processor is configured to:
   after the inattention of the driver is detected, when the lane is detected, set a target speed of the deceleration control to a particular speed.

4. The apparatus of claim 1, wherein the processor is configured to:
   when the lane and the surrounding vehicle are not detected after the inattention of the driver is detected, perform the deceleration control based on a lane detected before the inattention of the driver is detected, a heading angle of the vehicle, a speed of the vehicle, a yaw rate of the vehicle, and a curvature of the road.

5. The apparatus of claim 4, wherein the processor is configured to:
   calculate an estimated time of departure from the detected lane, the heading angle of the vehicle, the speed of the vehicle, the yaw rate of the vehicle, and the curvature of the vehicle detected before the inattention of the driver is detected; and
   perform the deceleration control based on the estimated time of departure.

6. The apparatus of claim 4, wherein the processor is configured to:
   set a target speed of the deceleration control based on the estimated time of departure and a predetermined parameter.

7. The apparatus of claim 1, wherein the processor is configured to:
   after the inattention of the driver is detected, when the lane is not detected and when the surrounding vehicle is recognized, compare a movement trajectory of the surrounding vehicle with a curvature of the road, the curvature being received from the navigation; and
   perform the deceleration control based on the compared result.

8. The apparatus of claim 7, wherein the processor is configured to:
   calculate a Euclidean distance between the movement trajectory of the surrounding vehicle and the curvature of the road; and
   perform the deceleration control based on the Euclidean distance.

9. The apparatus of claim 7, wherein the processor is configured to:
   set a target speed of the deceleration control based on a compared result between the movement trajectory of the surrounding vehicle and the curvature of the road and a predetermined parameter.

10. The apparatus of claim 1, wherein the processor is configured to:
    change a target speed of the deceleration control based on acceleration of a following vehicle of the vehicle.

11. The apparatus of claim 1, wherein the processor is configured to:
    change a target speed of the deceleration control based on a speed of a surrounding vehicle adjacent to a side of the vehicle.

12. The apparatus of claim 1, further comprising:
    a communication circuit configured to communicate with an external device,
    wherein the processor is configured to automatically transmit an emergency notification using the communication circuit when the deceleration control is performed.

13. The apparatus of claim 12, wherein the processor is configured to:
    change a target speed of the deceleration control based on acceleration of a following vehicle of the vehicle or a speed of a surrounding vehicle adjacent to a side of the vehicle; and
    determine whether to transmit the emergency notification based on a target speed before the change and the changed target speed.

14. A method for setting a speed of a vehicle, comprising:
    detecting, by a processor, inattention of a driver of the vehicle based on an operation for a steering device of the vehicle, an operation for a deceleration device of the vehicle, an operation for an acceleration device of the vehicle, or an image captured by a camera which captures an image of the inside of the vehicle;
    when the inattention of the driver is detected, obtaining, by the processor, information associated with a lane of a road in which the vehicle is traveling and information associated with a surrounding vehicle of the vehicle based on an image obtained by a camera which captures an image of the outside of the vehicle, a heading angle of the vehicle, a speed of the vehicle, a yaw rate of the vehicle, a trajectory of the surrounding vehicle, or a curvature of the road; and performing, by the processor, deceleration control based on the obtained information.

15. The method of claim 14, further comprising:

detecting, by the processor, the inattention of the driver, in response to determining that there is no driver operation of the steering device during a first time interval, no driver operation of the deceleration device or the acceleration device during a second time interval, and that the driver does not look in a forward direction of the vehicle based on an image captured by the first camera.

16. The method of claim 14, further comprising:

when the lane and the surrounding vehicle are not detected after the inattention of the driver is detected, performing, by the processor, the deceleration control based on a lane detected before the inattention of the driver is detected, a heading angle of the vehicle, a speed of the vehicle, a yaw rate of the vehicle, and a curvature of the road.

17. A non-transitory computer readable medium containing program instructions executed by a processor, the non-transitory computer readable medium comprising:

program instructions that detect inattention of a driver of the vehicle based on an operation for a steering device of the vehicle, an operation for a deceleration device of the vehicle, an operation for an acceleration device of the vehicle, or an image captured by a camera which captures an image of the inside of the vehicle;

when the inattention of the driver is detected, program instructions that obtain information associated with a lane of a road in which the vehicle is traveling and information associated with a surrounding vehicle of the vehicle based on an image obtained by a camera which captures an image of the outside of the vehicle, a heading angle of the vehicle, a speed of the vehicle, a yaw rate of the vehicle, a trajectory of the surrounding vehicle, or a curvature of the road; and program instructions that perform deceleration control based on the obtained information.

18. The non-transitory computer readable medium of claim 17, further comprising:

program instructions that detect the inattention of the driver, in response to determining that there is no driver operation of the steering device during a first time interval, no driver operation of the deceleration device or the acceleration device during a second time interval, and that the driver does not look in a forward direction of the vehicle based on an image captured by the first camera.

19. The non-transitory computer readable medium of claim 17, further comprising:

when the lane and the surrounding vehicle are not detected after the inattention of the driver is detected, program instructions that perform the deceleration control based on a lane detected before the inattention of the driver is detected, a heading angle of the vehicle, a speed of the vehicle, a yaw rate of the vehicle, and a curvature of the road.

* * * * *